(12) United States Patent
Vetrovec

(10) Patent No.: US 7,085,304 B2
(45) Date of Patent: Aug. 1, 2006

(54) DIODE-PUMPED SOLID STATE DISK LASER AND METHOD FOR PRODUCING UNIFORM LASER GAIN

(75) Inventor: Jan Vetrovec, Thousand Oaks, CA (US)

(73) Assignee: The Boeing Company, Chicago, IL (US)

( * ) Notice: Subject to any disclaimer, the term of this patent is extended or adjusted under 35 U.S.C. 154(b) by 244 days.

(21) Appl. No.: 10/441,373

(22) Filed: May 19, 2003

(65) Prior Publication Data

US 2004/0233960 A1    Nov. 25, 2004

(51) Int. Cl.
*H01S 3/08* (2006.01)
(52) U.S. Cl. .......................................... 372/107; 372/69
(58) Field of Classification Search ................. 372/66, 372/67, 71, 107
See application file for complete search history.

(56) References Cited

U.S. PATENT DOCUMENTS

| | | | |
|---|---|---|---|
| 5,553,088 A * | 9/1996 | Brauch et al. | 372/34 |
| 5,978,407 A | 11/1999 | Chang et al. | |
| 6,339,605 B1 | 1/2002 | Vetrovec | |
| 2002/0097769 A1 | 7/2002 | Vetrovec | |
| 2002/0110164 A1 | 8/2002 | Vetrovec | |
| 2002/0172253 A1 | 11/2002 | Vetrovec | |
| 2003/0019757 A1 | 1/2003 | Vetrovec | |
| 2004/0095975 A1 * | 5/2004 | Bruesselbach et al. | 372/36 |

FOREIGN PATENT DOCUMENTS

| | | |
|---|---|---|
| EP | 0869591 A | 10/1998 |
| EP | 1278278 A | 1/2003 |
| EP | 04011719 | 7/2004 |

OTHER PUBLICATIONS

*Development of Solid-State Disk Laser for High-Average Power*, John Vetrovec, Andrea Koumvakalis, Rashmi Shah, Tom Endo, Lasers & Electro-Optics Systems, The Boeing Company, San Jose, CA, Jan. 26-31, 2003, p. 1-11.

(Continued)

*Primary Examiner*—Minsun Harvey
*Assistant Examiner*—Dung (Michael) T. Nguyen
(74) *Attorney, Agent, or Firm*—Ingrassia Fisher & Lorenz, P.C.

(57) ABSTRACT

Methods, systems and apparatus are provided for amplifying a source light in a solid state laser. An amplifier module for the solid state laser suitably includes a disk having two substantially parallel surfaces and an optical gain material. A number of diode bars are arranged about the perimeter of the disk and configured to provide optical pump radiation to the laser gain material in the disk. Each of the plurality of diode bars is spatially aligned with the disk in such a manner as to produce substantially uniform gain across the optical gain material. The fast axes of the diode bars maybe aligned to be parallel or orthogonal to the parallel surfaces of the disk, for example.

29 Claims, 13 Drawing Sheets

OTHER PUBLICATIONS

*Solid-State Disk Laser for High-Average Power*, John Vetrovec, Andrea Koumvakalis, Rashmi Shah, Lasers & Electro-Optics Systems, The Boeing company, Wroclaw, Poland, Aug. 26-30, 2002, p. 1-4.

*Ultrahigh-Average Power Solid-State Laser*, John Vetrovec, The Boeing Company, Canoga Park, CA, Apr. 22-26, 2002, p. 1-15.

*Compact Active Mirror Laser (CAMIL)*, John Vetroec, The Boeing Company, Canoga Park, CA Jan. 22-26, 2001, p. 1-12.

Traian Dascalu et al, Diode Edge-Pumped Microship Composite Yb: YAG Laser, Japanese Journal of Applied Physics, vol. 41, No. 6A, Part 2, Jun. 1, 2002, pp. L606-L608.

* cited by examiner

DIODE-PUMPED SOLID STATE DISK LASER AND METHOD FOR PRODUCING UNIFORM LASER GAIN

GOVERNMENT RIGHTS

This invention was made with Government support under contract number F49620-02-C-0035 awarded by the United States Air Force. The Government has certain rights to this invention.

TECHNICAL FIELD OF THE INVENTION

The present invention generally relates to solid-state lasers, and more particularly relates to devices, systems and techniques for incorporating diode pumping into solid-state lasers.

BACKGROUND OF THE INVENTION

Lasers are becoming increasingly used in industrial and military settings. Lasers are commonly used in industrial processes, for example, to cut and weld metals and other substances, particularly in the automotive, aerospace, appliance and shipbuilding industries. Lasers may also be useful for rock drilling for mining and/or oil and gas exploration purposes. In military settings, lasers are particularly useful in precision strike situations where it is desirable to minimize collateral damage. Lasers have also been mounted on spacecraft, aircraft, ships and land-based vehicles for other military-related purposes, including missile defense.

Solid-state lasers (SSLs), in particular, have received particular attention in recent years. Such lasers typically include a solid-state lasing medium (crystal or glass) doped with suitable rare-earth ions that are optically pumped with light emitting from one or more semiconductor diodes to produce coherent light. Although SSLs are effective for many purposes, design issues may arise in dealing with waste heat produced within the lasing medium. This heat can cause various types of thermo-mechanical and thermo-optical distortions in the laser, resulting in thermal lensing, mechanical stresses, depolarization and other undesirable effects. In extreme cases, these effects could result in degradation in beam quality (BQ), reduced laser power and/or possible fracture of the SSL lasing medium.

One type of SSL used in high average power (HAP) applications is the so-called "disk laser", in which the lasing medium is formed into a disk shape that can be exposed to pump radiation for amplification of a laser beam. FIGS. 1(a) and 1(b) show exemplary disk amplifier modules that transmit and reflect laser light, respectively. In a transmissive disk amplifier, the laser beam passes through the lasing medium. Heat is removed by flowing suitable cooling medium (gas or liquid) over the large faces of the disk. In a reflective disk amplifier (also know as active mirror), one face of the disk may be provided with a reflective coating such that the laser beam exists through the face opposite the coating after making two passes through the disk. Heat is primarily transmitted through the coating to a heat exchanger or the like. In disk lasers, the temperature gradient is generally parallel to the laser beam path, which makes the disk lasers far less susceptible to many of the thermo-mechanical distortions discussed above. Design issues still remain, however, in obtaining improved laser performance and reducing the price of the laser. In particular, it is desirable to provide uniform optical gain across the aperture of the lasing medium to obtain good beam quality. Moreover, it is desirable to reduce the cost and complexity of the laser by reducing reliance upon custom-made components, by improving access to power and coolant within the laser assembly, and through other techniques.

Accordingly, it is desirable to create a solid-state laser with improved distribution of pump radiation across the lasing medium. Moreover, it is desirable to create a laser design that provides convenient access to power and coolant for the sources of pump radiation. In addition, it is desirable to create a laser that can be assembled from readily-available components. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

Methods, systems and apparatus are provided for amplifying a source light in a solid-state laser. An amplifier module for the solid-state laser suitably includes a disk having two substantially parallel surfaces and an optical gain material. A number of diode bars are arranged about the perimeter of the disk and configured to provide optical pump radiation to the laser gain material in the disk. Each of the plurality of diode bars is spatially aligned with the disk in such a manner as to produce substantially uniform gain across the optical gain material. The fast axes of the diode bars maybe aligned to be parallel or orthogonal to the parallel surfaces of the disk, for example.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

Figure 1:
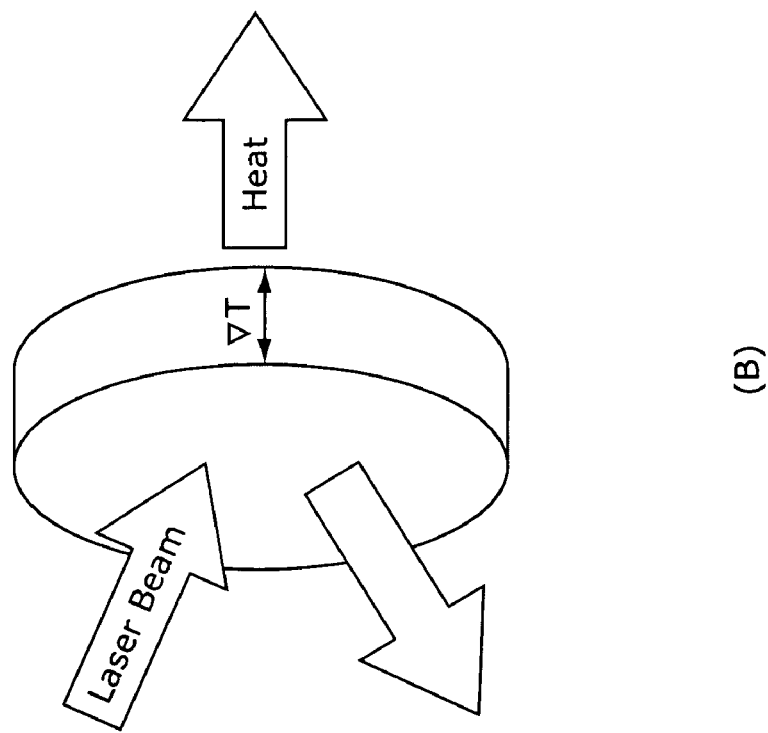
FIGS. 1(a) and 1(b) are perspective views of exemplary prior art transmissive and reflective amplifier disks, respectively.
Figure 1:
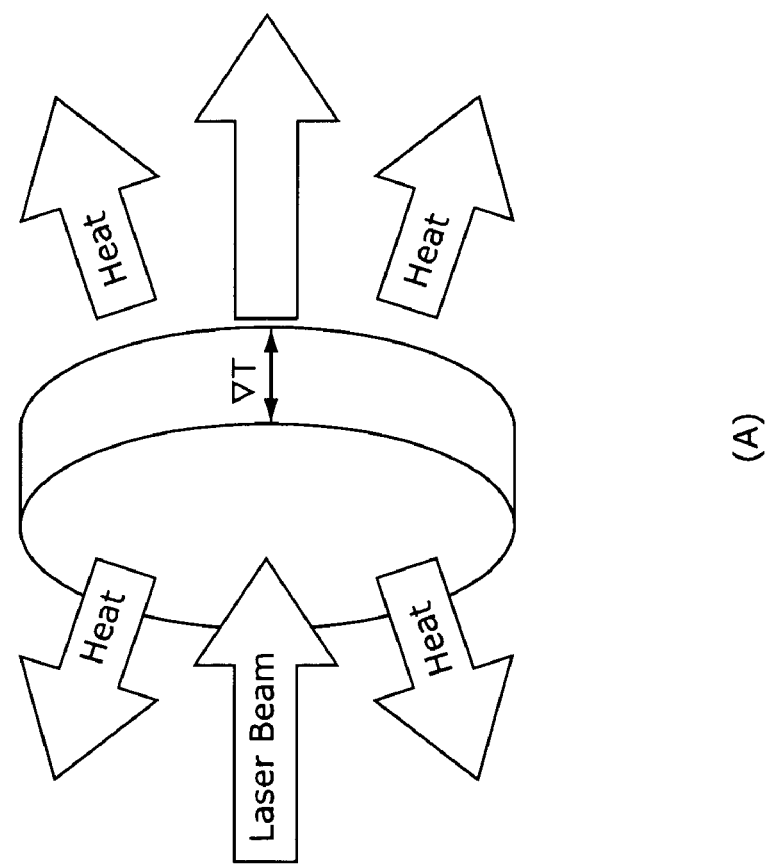

The following detailed description of the invention is merely exemplary in nature and is not intended to limit the invention or the application and uses of the invention. Furthermore, there is no intention to be bound by any theory presented in the preceding background of the invention or the following detailed description of the invention.

According to various exemplary embodiments, a solid-state laser is provided that includes an amplifier module that is capable of providing substantially uniform gain across the aperture of the optical gain material. Moreover, the amplifier module may be implemented with conventional diode bars mounted on water cooled heat exchangers, thereby significantly reducing the overall cost of the laser.

In various embodiments, a solid-state laser includes a disk-type gain medium, and optical pump radiation is provided at select positions along the peripheral edge of the disk. The laser gain medium disks may be of composite construction formed by attaching un-doped optical medium, amplified stimulation emission (ASE) absorption material, and/or other material to the peripheral edges of the laser gain medium. When an un-doped optical medium is provided, the un-doped portion may be shaped or formed to assist in receiving pump radiation and transporting the radiation to the laser gain medium.

In one embodiment, sources of optical pump radiation (e.g. diode bars) are placed in a generally circular pattern about the perimeter of the gain medium, with the fast axes of the sources oriented generally parallel to the large surfaces of the disk. In this embodiment, the high divergence of the source beamlets along the so-called "fast axes" may be used in conjunction with diode location, disk doping and/or other factors to produce approximately uniform gain across the surface of the gain medium. In another embodiment, pump radiation sources are placed in a generally polygonal pattern and oriented with the fast axes generally orthogonal to the large surfaces of the disk. In this embodiment, the size and shape of the polygonal pattern may be used in conjunction with disk doping and/or other factors to produce approximately uniform gain in the disk.

Various solid-state disk lasers as described herein may be used to construct laser oscillators as well as laser amplifiers operating in a pulsed (i.e. storage) mode, continuous wave (CW) mode, and/or long pulse (quasi-CW) mode, or the like. Further, various lasers may be operated in a continuously cooled mode, in a heat capacity mode, or the like. In one embodiment, the laser gain medium is provided with optical coatings for operation in an active mirror configuration. In another embodiment, the laser gain medium is fitted with anti-reflective coatings for "transmissive" operation or the like. Accordingly, the lasers and laser amplifier modules described herein may be used in a wide variety of products that may be used in any military, industrial, commercial or other setting.

As briefly mentioned above, "disk lasers" use a solid-state gain medium formed into a disk that generally includes two relatively large surfaces that are approximately parallel to each other. A laser beam undergoing amplification meets the amplifier disk at approximately normal incidence and/or Brewster angle to the surfaces, and at least one of the surfaces may be used to remove waste heat. The amplifier disk may be mounted on a substrate or other structure that typically includes a heat exchanger and various microchannels for providing cooling material to the heat exchanger. One type of disk laser that includes a large aperture laser gain medium disk of about 2.5 mm in thickness and a diameter of about 5–15 cm is described in commonly-assigned U.S. Pat. No. 6,339,605 hereby incorporated by reference, although the principles and structures described herein could be used in conjunction with any type of laser.

In a so-called "edge-pumped" disk laser, pump radiation is appropriately injected into a peripheral edge of the amplifier disk. Edge pumping (i.e. "side pumping") exploits the relatively long absorption path along the diameter of the disk to permit reduced doping concentrations of lasant ions. High concentration of lasant ions (i.e. doping) causes undesirable stresses in many important host crystals. This is particularly true for $Nd^{3+}$ ions doped into yttrium aluminum garnet (YAG). Furthermore, long absorption path allows the use of absorption lines with relatively small absorption cross-sections. In addition, in quasi-3-level lasers (such as using $Yb^{3+}$), reduced dopant concentration overcomes laser light re-absorption by the ground-state at correspondingly reduced pump radiation intensity and allows more efficient lasing. In various embodiments, an edge-pumped amplifier disk may be formed by attaching un-doped optical medium to the peripheral edges of the laser gain medium disk, as described more fully below. This construction allows for improved coupling between the source of optical pump radiation and the laser gain medium, concentration of optical pump radiation, cooling of the peripheral edge of the laser gain medium disk, and can be designed to trap ASE. With proper choice of laser gain medium doping, pump source divergence and geometry, a relatively uniform laser gain is achieved across large portions of the gain medium. Several examples of side-pumped active mirror solid-state laser for high average power applications are described in commonly-assigned United States Patent Application Publication Nos. 2002/0097769, 2002/0110164 and 2002/0172253, hereby incorporated by reference.

It is typically desirable to provide relatively uniform amplification across the entire active surface of the gain medium (i.e. "the disk aperture"). In general, portions of the gain medium closest to the pump source may be susceptible to being pumped more intensely than portions further away, however, thereby resulting in non-uniform pump energy distribution and non-uniform gain. This condition may perturb the optical phase front of the amplified laser light and result in undesirable loss of beam quality. Further, the weaker portions of the laser signal are susceptible to being amplified more than the stronger portions due to differences in saturation induced by the signal in the gain medium. To remedy such effects, the natural divergence of pump diodes and/or placement of the diodes may be exploited such that beamlets produced by multiple diodes overlap inside the gain medium, thereby summing the intensity of the pump radiation in the overlapping region. Volumetric density distribution of absorbed pump power depends primarily upon the power output and beamlet divergences of individual diode elements, as well as the distance of the diode elements from the disk center and the density of ground-state ions in the gain medium. Accordingly, by balancing the overlapping beamlets produced by multiple diodes and doping the disk with absorbing ions, variations in absorbed pump power across the aperture can be appropriately reduced, thereby improving gain uniformity in the amplifier.

Various types of pump diodes are available from a number of commercial sources. Typically, diodes used as SSL pump sources emit radiation from a surface that is on the order of about 1–2 μm high and about 100–200 μm wide. The narrower dimension (e.g. height) may be referred to as "the fast axis", and the wider dimension (e.g. width) may be referred to as "the slow axis" of the diode. A beamlet of radiation emitted from this surface is typically highly asymmetric in shape. In practice, the beamlet produced by a conventional diode is typically highly divergent (e.g about 30–60 degrees full-width at half maximum) in the direction parallel to the fast axis, and moderately divergent (e.g. about 8–12 degrees full-width at half maximum) in the direction parallel to the slow axis. Spatial profiling of such beamlets is therefore approximately bi-gaussian, with an elliptical cross-section.

Conventional laser diode elements for pumping SSL generate approximately one watt of optical output. For an exemplary 10 kilowatt solid-state laser, then, approximately 20–40 kilowatts of optical pump power may be needed, corresponding to 20–40 thousand diodes. Frequently, diodes are provided in one-dimensional arrays of ten or more diodes (called "diode bars") that typically provide 10 to 100 watts or so of average power. Diode bars may be equipped with electrical terminals and may be mounted on heat exchangers, as appropriate. Moreover, multiple diode bars may be stacked to create two-dimensional arrays (i.e. "diode stacks") that may provide a kilowatt or more of average output power while providing relatively convenient connections for coolant and electrical power. Because of the relatively high divergence in the direction of the fast axis, however, harnessing the output of diode arrays may be challenging for many practical applications. For this reason, some diode arrays include microlenses to shape the output radiation, but these lenses significantly increase the cost of the array while somewhat decreasing the output power. Laser diodes, diode bars and diode stacks are provided from multiple commercial vendors, including Coherent Inc. of Santa Clara, Calif., Industrial Microphotonics Company of St. Charles, Mont., Thompson-CSF of Orsay, France, and others.

Figure 2:
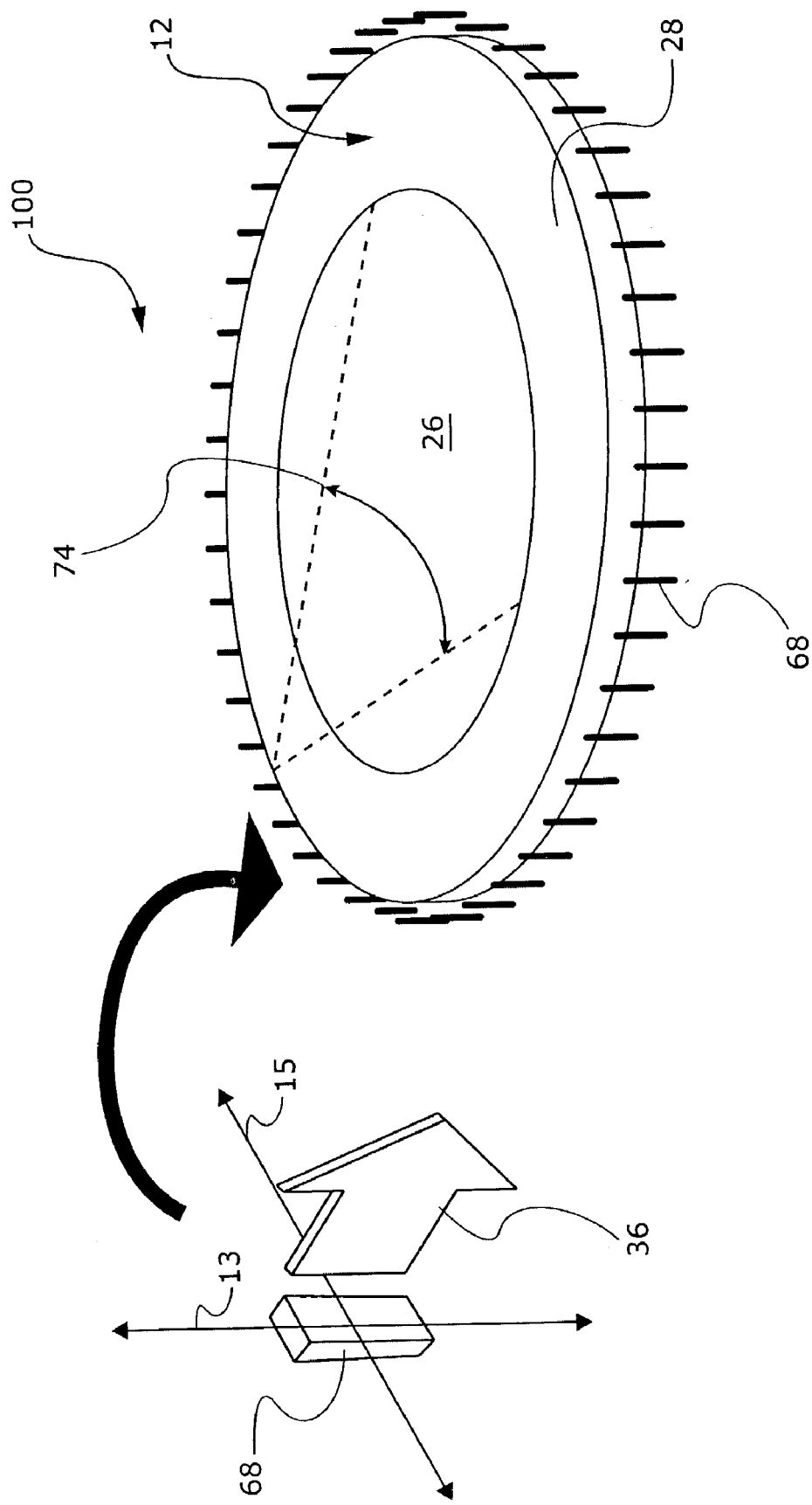
FIG. 2 is a perspective view of an exemplary amplifier module for a solid state laser.
Figure 3:
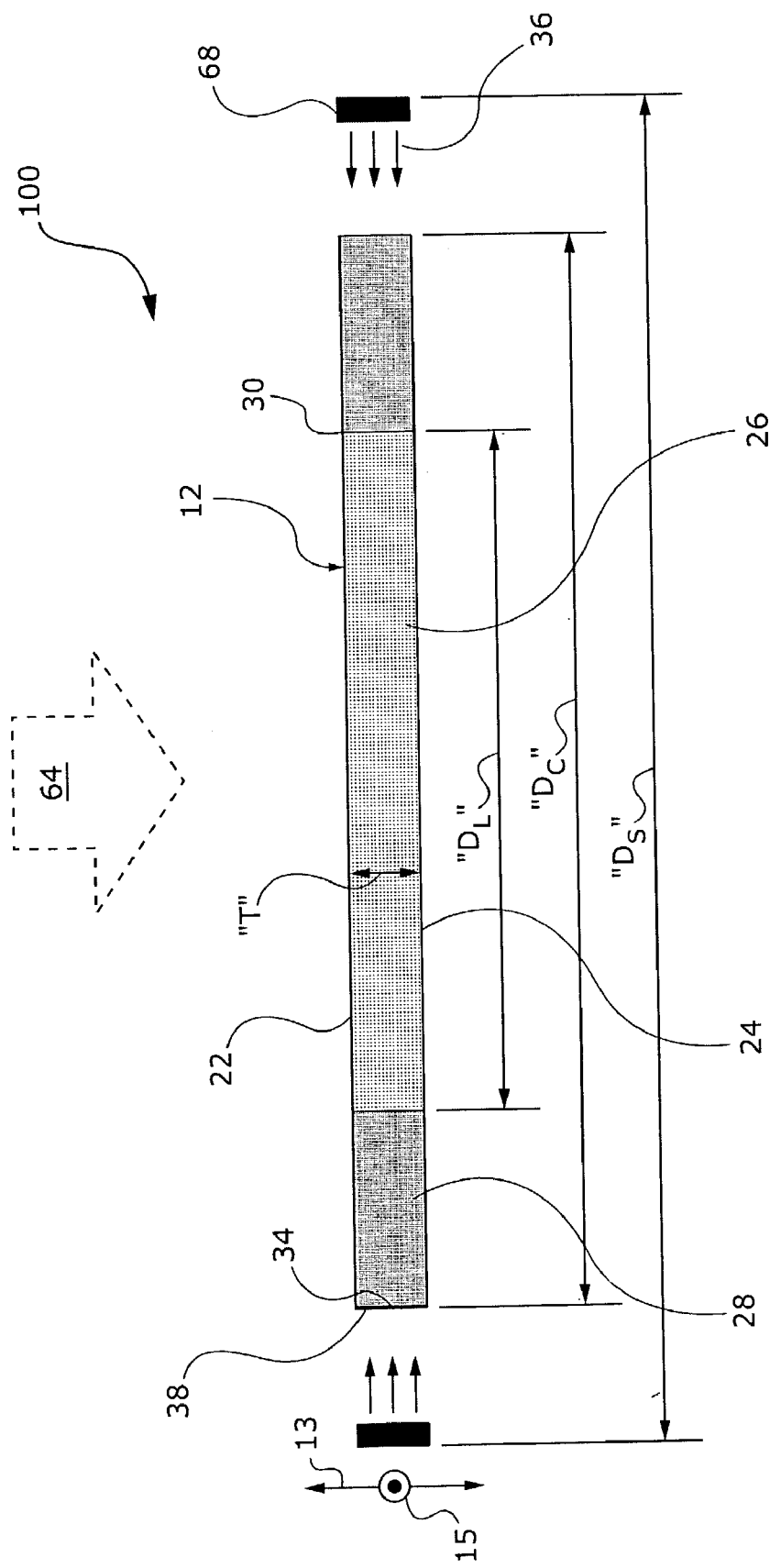
FIG. 3 is a cross-sectional view of the exemplary amplifier module shown in FIG. 2.

Turning now to the drawing figures and with initial reference to FIGS. 2 and 3, an exemplary embodiment of an amplifier module 100 suitable for use in a solid-state laser appropriately includes a disk 12 with any number of optical pump sources positioned about the perimeter of disk 12. The various optical pump sources generally provide optical pump radiation toward the center of disk 12, which appropriately includes a laser gain material 26 as described below. In various embodiments, each of the optical pump sources is a diode bar 68 oriented such that the fast axis 15 of the bar is appropriately oriented to be approximately parallel to large surfaces 22, 24 of disk 12. In this configuration, divergence of each beamlet 74 in the direction of the fast axis of diode bar 68 aids in providing relatively uniform pump radiation across the aperture of disk 12, as described more fully below. As used herein, the term "aperture" refers to the maximum transverse dimension of a laser beam that can be received, amplified and/or transmitted by amplifier module 100.

Disk 12 is generally a relatively flat structure that includes two approximately parallel surfaces 22 and 24 (FIG. 3). Each of the two surfaces 22 and 24 may be ground flat and polished to optical quality, as appropriate. Particular dimensions and shape of disk 12 may vary widely from embodiment to embodiment, but in an exemplary embodiment disk 12 is approximately round, with a thickness on the order of about 1–10 mm and a diameter of about 10–300 mm, with the transverse dimension ("$D_C$") typically being at least several times greater than the thickness ("T") of disk 12. In alternate embodiments, disk 12 may be formed in other shapes such as polygonal, circular, elliptical, or other shape defined by any combination of linear and/or curved segments. Accordingly, the term "disk" as used herein is intended to broadly encompass any range of equivalent structures without regard to shape, size or composition.

In various embodiments, disk 12 is a composite disk that includes both a laser gain medium 26 and an undoped optical medium 28 capable of transmitting optical radiation from the pump sources to laser gain material 26. Undoped medium 28 may be appropriately formed or bonded to the outer perimeter of gain medium 26. In an exemplary embodiment, the ratio of the diameter of the entire disk ($D_C$) to the diameter of the gain medium ($D_L$) is between about 1.5 and 3, although alternate disks 12 may be formed of any size or composition.

Disk 12 may also include a coating or cladding capable of absorbing undesired amplified spontaneous emissions (ASE), as described below, and/or may include reflective, anti-reflective and/or dichroic coatings as appropriate for operation as an amplifier of laser radiation. Outer surface 34 of the outer perimeter of disk 12 may include an anti-reflective coating 38, for example. Coating 38 may be a dielectric coating or other material that is substantially anti-reflective at optical pump and at laser wavelengths. Further, outer surface 34 may be machined or otherwise formed at an angle of about 1–10% off of normal to surfaces 22, 24 to further reduce ASE feedback to parasitic oscillations.

Disk 12 includes any laser gain material 26 that is capable of amplifying a laser beam in response to optical pump radiation 36. Laser gain material 26 may be implemented with suitable optical material having a host lattice doped with suitable ions capable of being pumped to laser transition. Examples of host lattice materials used in various embodiments include yttrium aluminum garnet (YAG), gadolinium gallium garnet (GGG), gadolinium scandium gallium garnet (GSGG), yttrium lithium fluoride (YLF), yttrium vanadate, phosphate laser glass, silicate laser glass, sapphire, and the like. Exemplary dopants for the lasing medium include Ti, Cu, Co, Ni, Cr, Ce, Pr, Nd, Sm, Eu, Gd, Tb, Dy, Ho, Er, Tm and Yb, although other materials could be used in alternative embodiments. If the laser beam 64 has an angle of incidence with disk 12 that is approximately normal, the perimeter of gain medium 26 may be circular or nearly circular to provide good mode fill; in embodiments wherein laser beam 64 has an angle of incidence that is significantly off of the normal, the perimeter of gain medium 26 may be more elliptical in shape. For example, a polarized laser beam incident onto disk 12 at a Brewster angle can be efficiently amplified even when the disk surfaces through which the beam enters and/or exits the disk do not have anti-reflection coatings.

In various embodiments, undoped material 28 is a similar material to that used for laser gain medium 26 in undoped form (i.e. without a substantial concentration of substances that can absorb optical pump radiation). In some variants, undoped material 28 may be slightly doped with ions capable of absorbing optical radiation at the wavelengths of the optical pump and/or the laser gain transition, but are not pumped to a population inversion. Such material may be used to absorb ASE radiation. Undoped material 28 may be attached to various surfaces of laser gain medium 26 by any technique, including fusion bonding, diffusion bonding, optical contact followed by heat treatment, casting or the like, with the various bonds 30 being highly transparent at both the laser and the pump wavelengths and having a generally same thermal conductivity as the parent material. Undoped medium 28 provides a number of benefits to laser amplifier module 100. In addition to transporting pump radiation from diode bars 68 to gain material 26, undoped medium 28 provides a heat conduction path away from gain medium 26 to thereby reduce thermal stresses in disk 12 and associated distortions in beam 64. Moreover, undoped material 28 can be chosen to have an index of refraction closely matching that of gain medium 26 to thereby allow ASE rays to cross the boundary between the two materials without significant reflection.

As briefly mentioned above, the sources of pump radiation may be commercially available diode bars 68 that are positioned around the perimeter of disk 12 and that are oriented to provide pump radiation 36 generally toward the center of gain medium 26 as appropriate. As used herein, the term "diode bar" is intended to broadly encompass any array of diodes, including any type of diode bar, diode stack, or the like. Each diode bar 68 typically has a slow axis 13 and a fast axis 15 corresponding to the long and short dimensions of the diode bar face, as appropriate. The various diode bars 68 are suitably positioned in relatively close proximity to the peripheral edge surface 34 of composite disk 12 so that diode output is efficiently coupled to disk 12. Diode bars 68 may be positioned at a transverse distance $D_S$ across disk 12, with $D_S$ being slightly greater than the transverse dimension $D_C$ of disk 12.

Each diode bar 68 provides pump radiation 36 in the form of a beamlet 74 at an appropriate wavelength to induce laser transition in the dopant ions of gain medium 26. When the various diode bars 68 are oriented with fast axis 15 generally parallel to the planes of surfaces 22 and 24, beamlet divergence can be exploited such that each diode bar 68 provides radiation across a relatively large portion of gain medium 26. Accordingly, output beamlet 74 generated by each diode bar 68 diverges to illuminate a relatively large portion of laser gain medium 26. In such embodiments, diode bars 68 typically do not include microlenses that would otherwise reduce fast axis divergence.

During operation, each diode bar 68 injects optical radiation 36 through optical coating 38 and surface 34 into the undoped medium 28, which appropriately transmits received radiation 36 to gain medium 26. Transmission by undoped medium 28 may be aided by multiple internal reflections from surfaces 22 and 24, as appropriate.

Pump radiation 36 pumps the dopant species in laser gain medium 26 to laser transitions that allow gain medium 26 to amplify incident laser beam 64. Pump radiation 36 is gradually absorbed during passage through laser gain medium 26. For an exponentially absorbing medium, this absorption process follows Beer's Law: $I(x)=I_0 \exp(-ax)$, where "x" is the distance into the absorbing medium, "a" is the absorption coefficient of the medium, "$I_0$" is the initial intensity of pump radiation, and "I(x)" is the pump radiation intensity after traveling distance "x" into the absorption medium. Gain medium 26 may be appropriately doped such that that about ninety percent or more of the incident pump radiation 36 is absorbed in a single pass through the medium, although other embodiments may have widely varying absorption parameters.

The concepts described above can be enhanced and/or modified in many ways to arrive at any number of equivalent embodiments. Composite disk 12 may take many alternate forms, for example, and/or may be further enhanced to improve coupling efficiency for radiation provided from diode bars 68 to disk 12.

Figure 4:
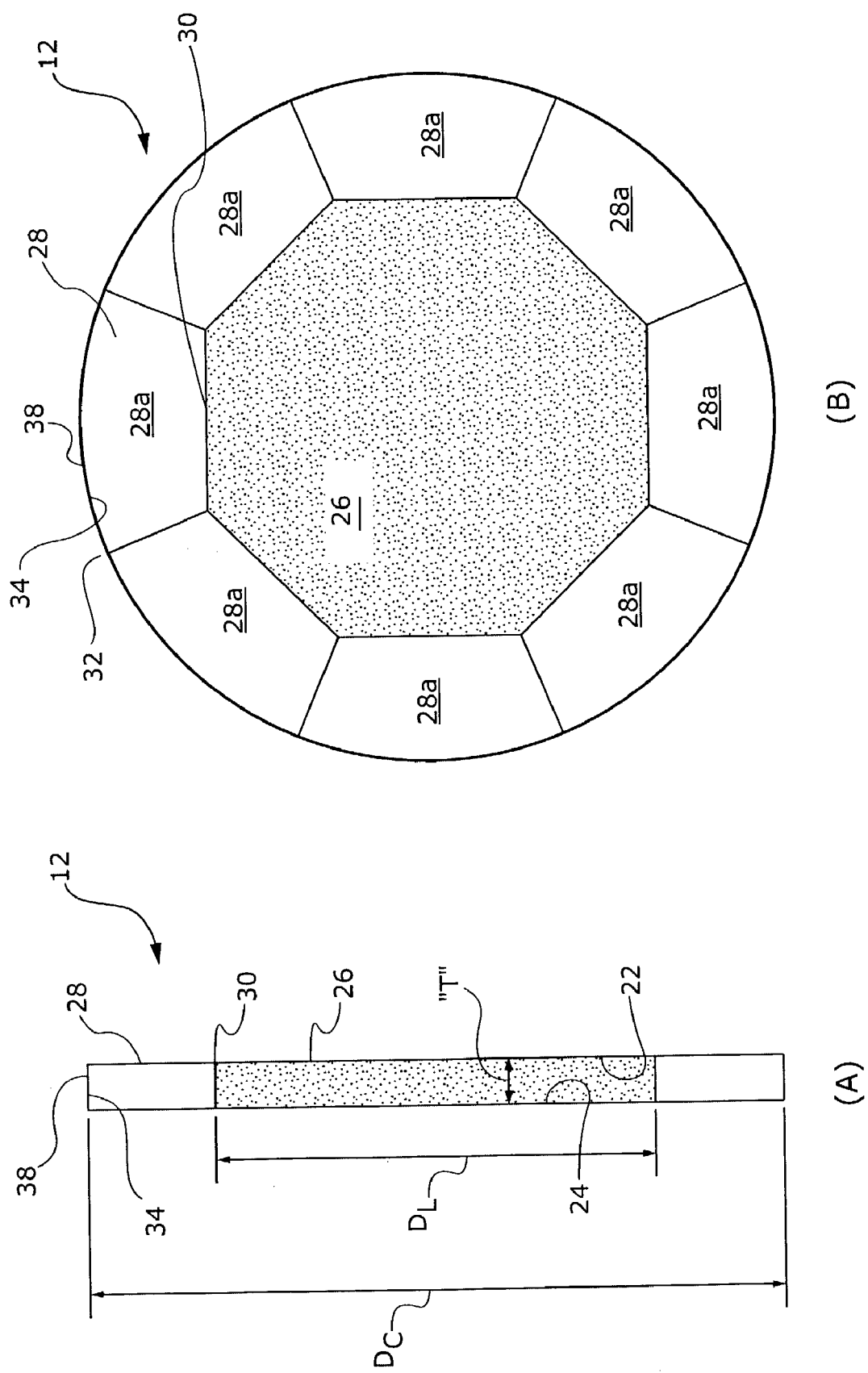
FIGS. 4(a) and 4(b) are cross-sectional and top views of an exemplary alternate embodiment of a composite disk.

FIGS. 4(*a*) and 4(*b*) are side and top views (respectively) of an exemplary composite disk 12. With reference now to FIGS. 4(*a*) and 4(*b*), a composite disk 12 may be suitably formed from any number of segments 28A coupled to an appropriately-shaped gain medium 26. Each segment 28A of un-doped optical medium 28 may be appropriately formed of similar material to gain medium 26 and may be attached to gain medium 26 by a fusion bond, diffusion bond, or other process as described above. Each segment 28A is separated from each of its adjoining segments 28A by a gap 32, however, which may make disk 12 less susceptible to thermal stresses. Moreover, the various segments 28A may act as thermal traps for ASE photons, thereby improving the performance of disk 12. Further, bonding to linear segments 30 may be easier in practice and more reliable than bonding to rounded surfaces in some embodiments. Although FIG. 4(*b*) shows laser gain medium 26 as being octagonal in shape, gain medium 26 and/or disk 12 may take any shape in a wide variety of alternate embodiments.

As mentioned above, many commercial embodiments of diode bar 68 may be about one centimeter in length. Laser gain medium 26, however, may be only a few millimeters in thickness in many embodiments. To efficiently couple pump radiation from diode bar 68 to gain medium 26, then, it may be beneficial in some embodiments to include a concentrator and/or lens between diode bars 68 and disk 12, or to design disk 12 to efficiently receive optical pump radiation from diode bar 68.

Figure 5:
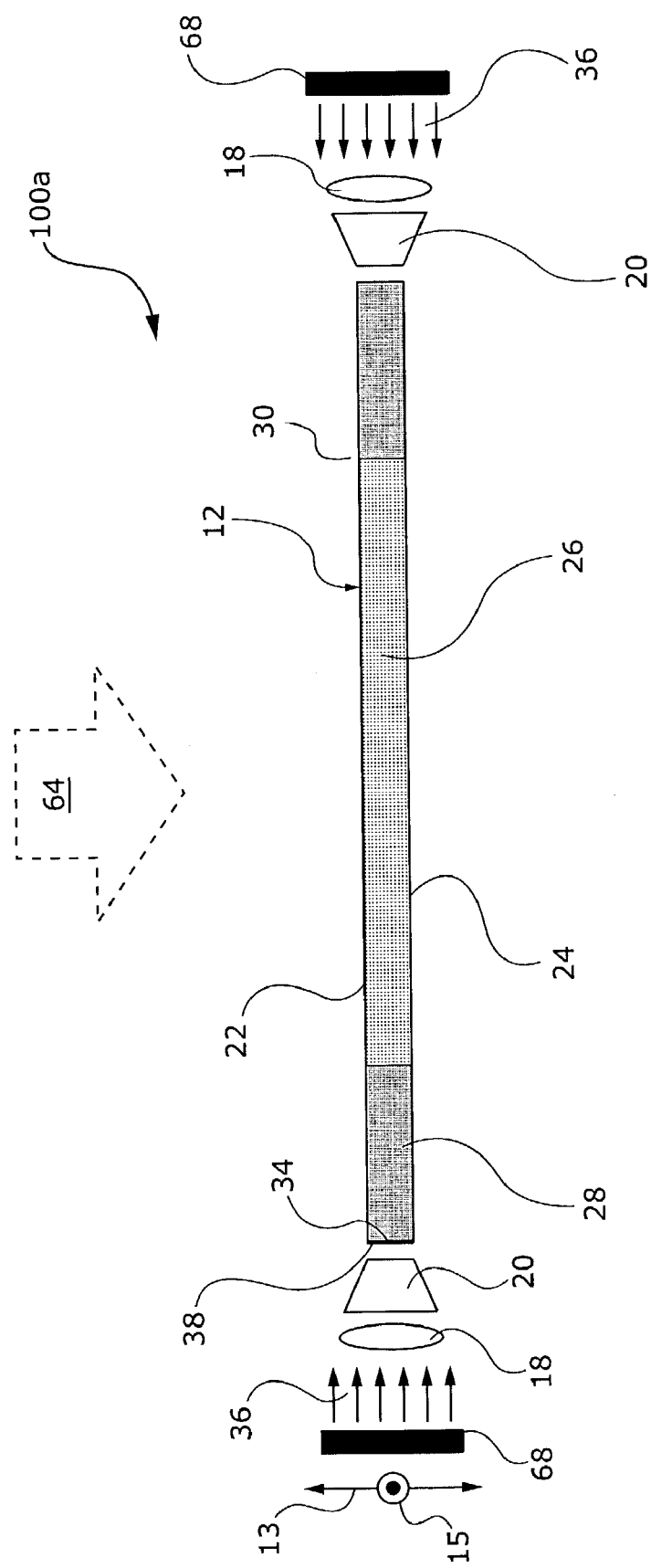
FIG. 5 is a cross-sectional view of an exemplary amplifier module with a concentrator and lens assembly.

With reference now to FIG. 5, a disk amplifier module 100*a* suitably includes a concentrator 20 and/or a lens 18 capable of focusing, collimating or otherwise directing pump radiation 36 from diode bars 68 to disk 12. Concentrator 20 may be any type of non-imaging concentrator, for example, and may be formed in the shape of a conical annulus or the like. Alternatively, concentrator 20 may be provided in two or more segments about the periphery of disk 12. Various types of non-imaging concentrators 20 are made of solid optical materials or are formed as a hollow duct as described, for example, in commonly-assigned United States Patent Application Publication No. 2002/0097769, hereby incorporated by reference. When solid optical material is used, the input surface (i.e. the surface closest to diode bars 68) may optionally be machined or otherwise formed to provide a lensing effect. Alternatively, a separate lensing element 18 may be provided to focus optical pump radiation 36 toward the input surface of concentrator 20 or disk 12.

Figure 6:
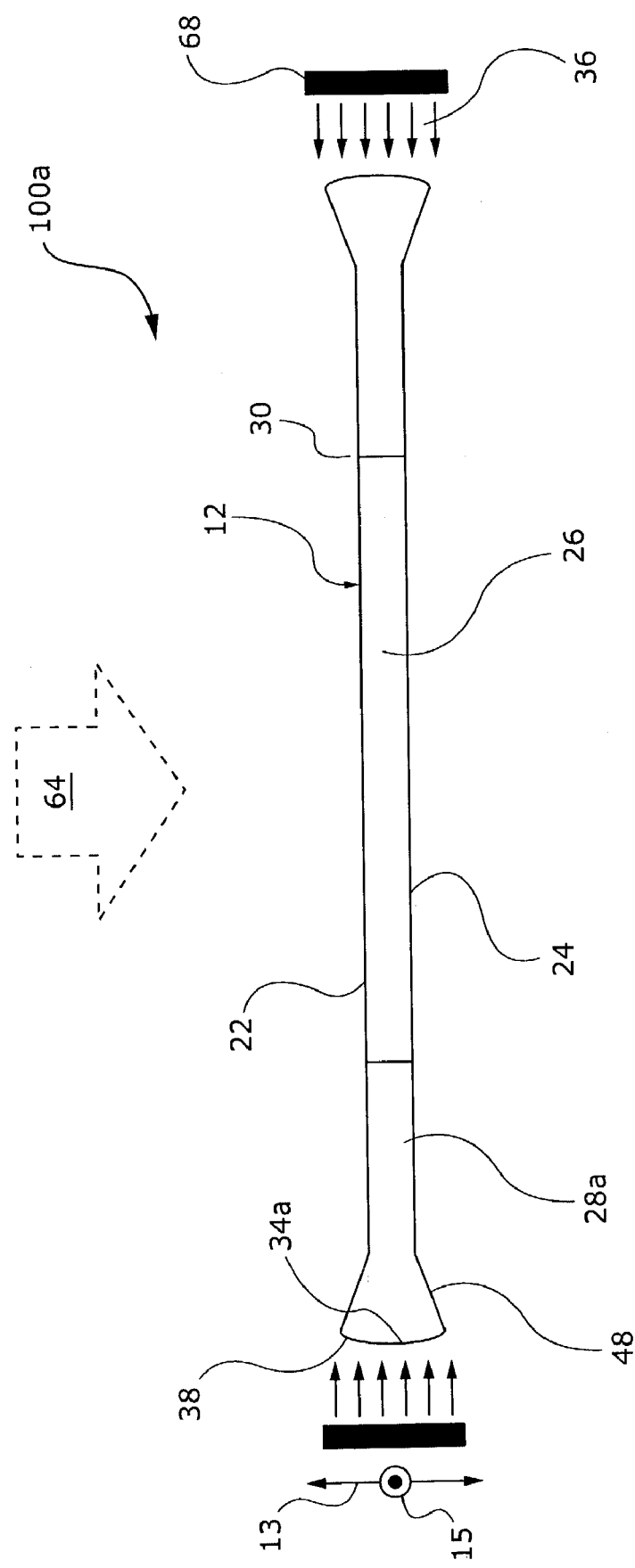
FIG. 6 is a cross-sectional view of an exemplary amplifier module with a rounded edge and a tapered portion.
Figure 7:
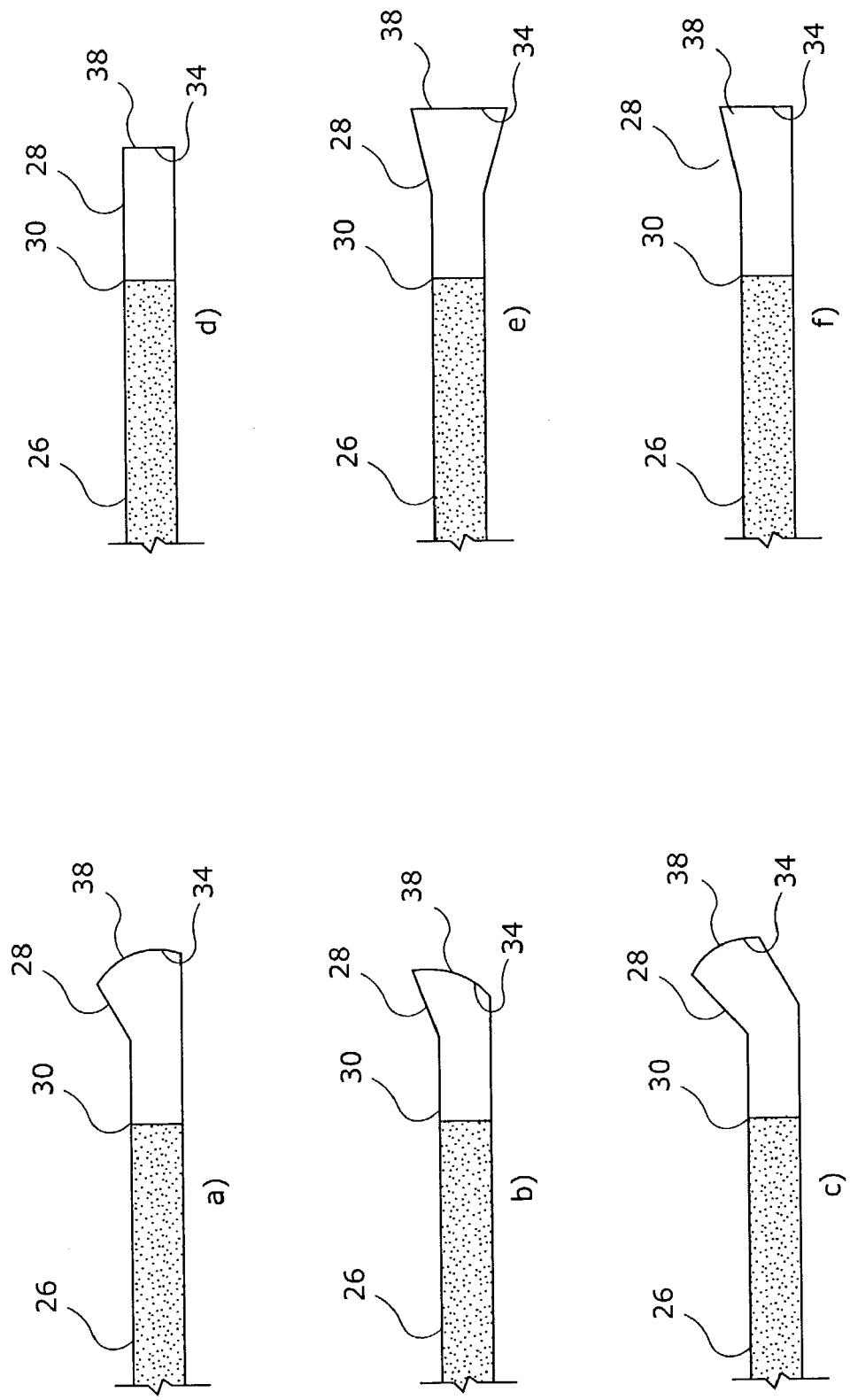
FIGS. 7(a)–(f) are cross-sectional views of exemplary alternate embodiments of a composite disk.

Each component placed in the optical path between diode bar 68 and disk 12, however, may induce some optical loss that could affect the efficiency of amplifier module 100*a*. Accordingly, in various embodiments a portion of disk 12 may be formed to assist in collecting optical radiation from the various diode bars 68. With reference to FIG. 6, for example, a disk amplifier module 100*a* suitably includes a composite disk 12 wherein the undoped portion 28*a* is formed with a tapered portion 48 and may further incoporate a curved surface 34*a* on the input surface of the disk. In such embodiments, tapered portion 48 suitably performs the functions of a concentrator, and curved surface 34*a* performs the functions of a lens, as appropriate. Tapered portion 48 and curved surface 34*a* may be formed in the undoped portion 28*a* of disk 12 in any manner, such as through machining of the undoped material. The input edges of disk 12 may be further provided with a dielectric or other anti-reflective coating 38, as described above. Various exemplary edge configurations for disk 12 are shown in FIGS. 7(*a*)–(*f*).

Amplified spontaneous emission (ASE) is a phenomenon wherein spontaneously emitted photons traverse laser gain medium 26 and are amplified before they depart from the gain medium. ASE is most common when conditions provide a combination of high gain and a long path for the spontaneously emitted photons. ASE depopulates the upper energy level in excited laser gain medium and robs the laser of its power. Furthermore, reflection of ASE photons at gain medium boundaries may provide feedback for parasitic oscillations that aggravate the loss of laser power. If unchecked, ASE may become large enough to deplete the upper level inversion in high-gain laser amplifiers.

Figure 8:
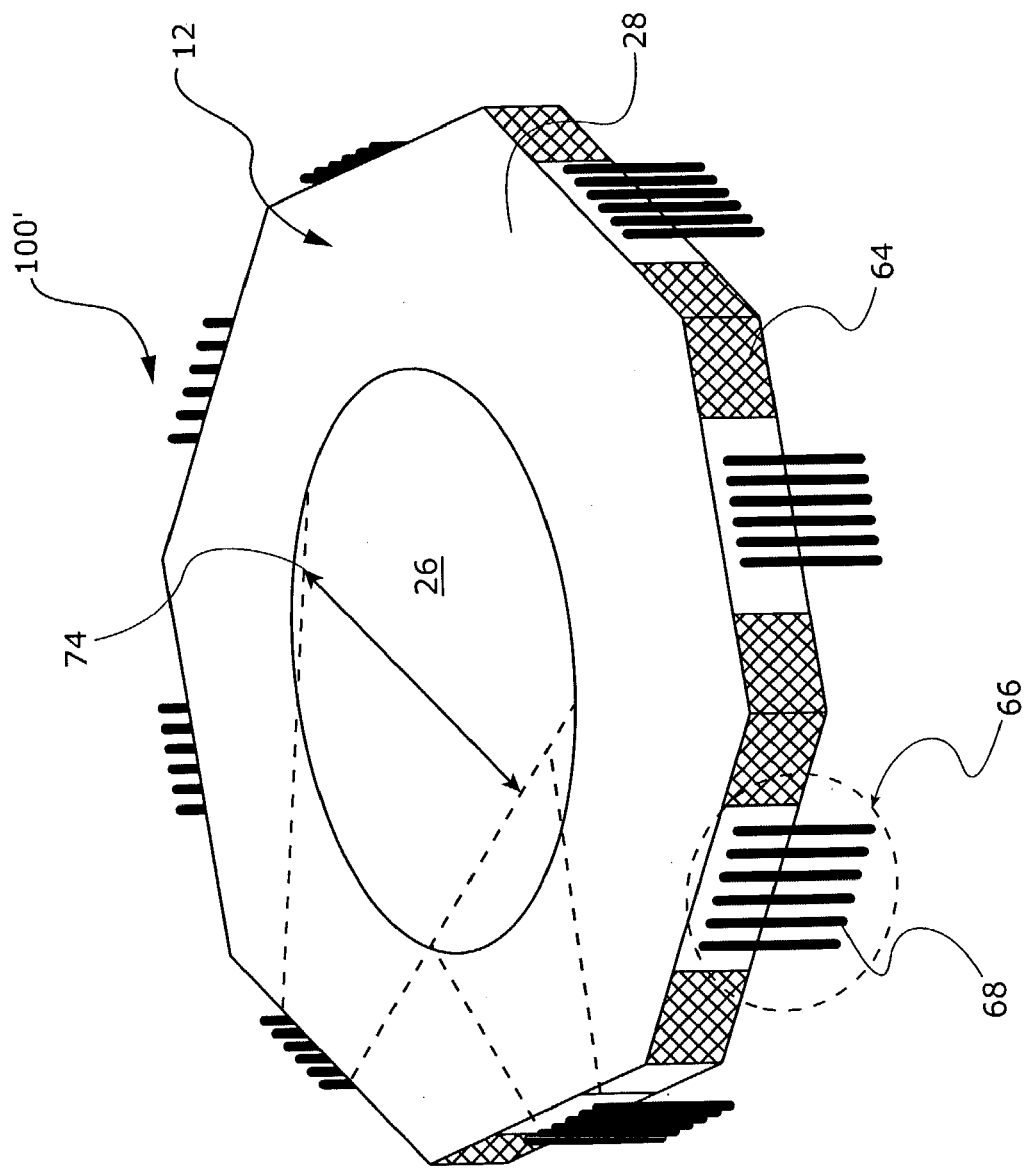
FIG. 8 is a perspective view of an exemplary amplifier module with diode bar grouping and ASE absorption material.

Referring now to FIG. 8, an exemplary disk amplifier module 100 for reducing the effects of ASE suitably includes a composite disk 12 having ASE absorption material 64 disposed along a polygonal perimeter. Various diode bars 68 are appropriately provided in groups 66 that are interspersed around the perimeter of disk 12. In the exemplary embodiment shown in FIG. 8, each diode bar group 66 is placed adjacent to one of the polygonal edges of disk 12. In various embodiments, each diode group 66 is implemented with a diode stack as described above. Each diode bar 68 is appropriately oriented with the fast axis generally parallel to the planes of the large surfaces of disk 12 to provide wide coverage of laser gain medium 26 for each divergent beamlet 74, as shown.

Portions of the perimeter of disk 12 that are not illuminated by diode radiation may be provided with an ASE absorption material 64 such as an appropriate coating or cladding. ASE absorption material 64 is any material capable of attaching onto selected surfaces of disk 12 that have the capability to absorb optical radiation at the wavelengths of one or more laser transitions in laser gain medium 26. Examples of ASE absorption coatings include various thin films that are combinations of materials with indices of refraction greater than the index of refraction of the laser gain medium. Exemplary coating materials include germanium, silicon, gold, silver, silica, diamond, graphite, dried graphite ink, and some semiconductors and halides. Exemplary ASE absorption cladding materials include glass (such as phosphate glass, silicate glass, fluorophosphate glass), crystals, ceramics, RTV(R) rubber, epoxy polymers or laminate of these materials. These materials may be also doped with absorbing ions as appropriate. Ions that absorb radiation at 1.06 micrometers, for example, include $Cu^{2+}$, $Sm^{3+}$, $Dy^{3+}$, $Cr^{4+}$, and $V^{3+}$. ASE absorption cladding should also have a refractive index closely matched to that of the laser medium to prevent reflection from edge-cladding interface. In addition, ASE absorption cladding may have a coefficient of thermal expansion closely matched to that of the laser gain medium to reduce thermal stresses. ASE absorption cladding may be bonded to selected surfaces of the laser gain medium by an adhesive, fusion bond, diffusion bond, optical contacting followed by heat treatment, or any other suitable technique. Such bond should be highly transparent at the laser wavelength and with refractive index closely matched to that of the laser gain medium.

As mentioned above, the various diode bars 68 may be combined into diode stacks in various embodiments. While diode stacks may be convenient for many applications, in practice it may be difficult to orient the fast axes of the diode bars in the stack parallel to the large surfaces of the laser disk. Further, if the diode bars forming the stack are mounted on heat exchangers, connections between the coolant ports of adjacent heat exchangers and between head exchangers and supply lines become increasingly complex if the diode bars are arranged with the fast axes parallel to the large surfaces of disk 12. Accordingly, it may not be practical to orient diode bars 68 in such a manner with respect to disk 12 in all embodiments.

Figure 9:
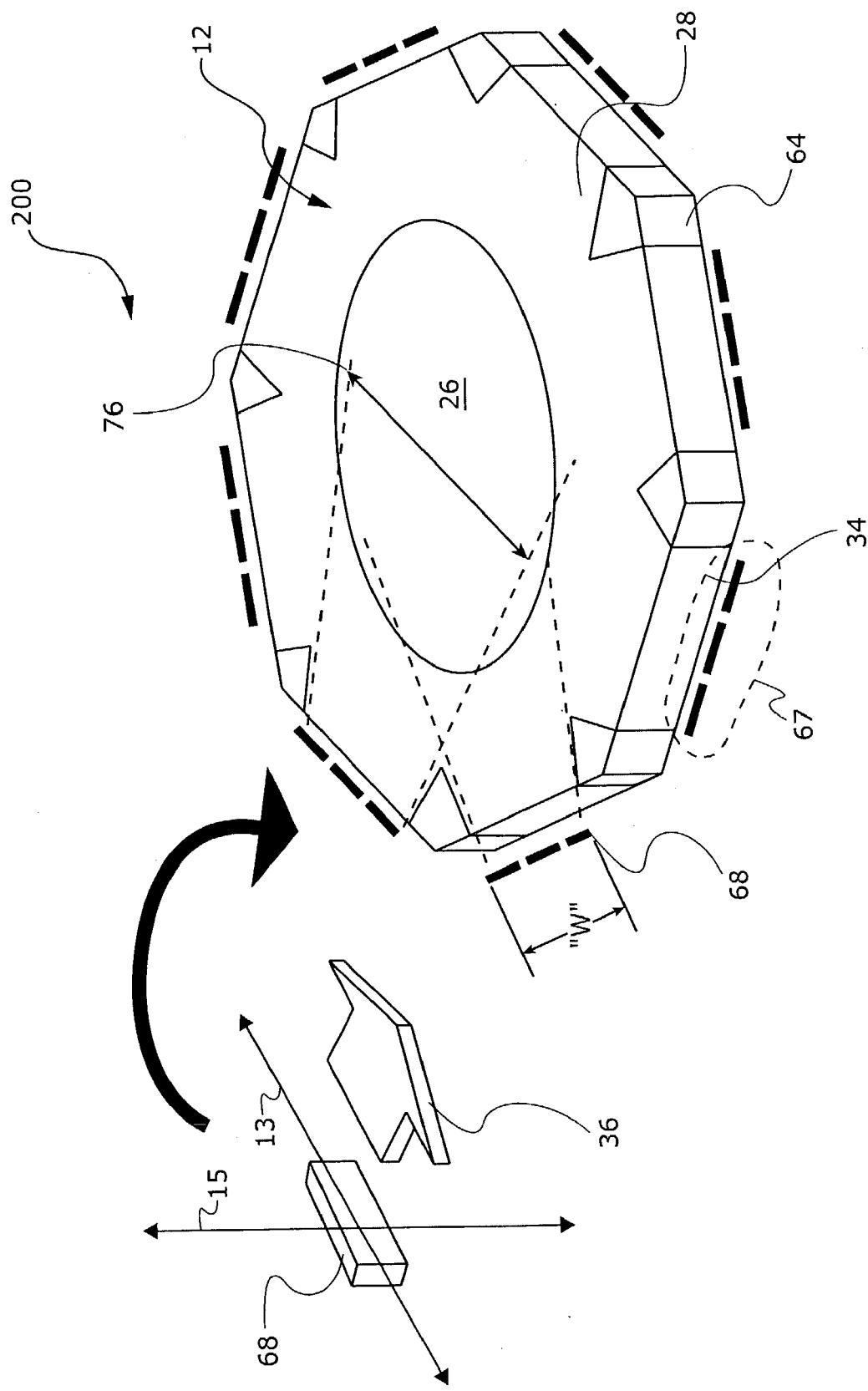
FIG. 9 is a perspective view of an alternate exemplary amplifier module with diode bar grouping and ASE absorption material.

Referring now to FIG. 9, an alternate embodiment of a solid state disk amplifier module 200 suitably includes any number of diode bars 68 located about the perimeter of a composite disk 12, but with the fast axes of bars 68 being oriented generally orthogonal to the large surfaces of disk 12. In such embodiments, pump radiation beam 76 is less divergent across gain medium 26, but a wider beam 76 is provided, thereby compensating for the reduced divergence.

Moreover, by orienting diode bars 68 with slow axis 13 parallel to the large surfaces of disk 12, interconnections to diode bars 68 for coolant and electrical power are greatly simplified. ASE absorption material 64 such as a coating and/or cladding could also be applied along perimeter edge 34 of disk 12 as appropriate.

Although FIG. 9 shows disk 12 as having an octagonal perimeter, disk 12 could be formed to take any shape such as polygonal (having any number of sides), circular, elliptical or the like. In particular, polygons with odd numbers of sides may be more effective for reducing feedback to parasitic oscillations. Similarly, diode bars 68 could be relocated around the perimeter of disk 12 in any manner. In an exemplary embodiment (and as shown in FIG. 9), a polygonal shape allows placing emitting surfaces of diode bars 68 into close proximity with the perimeter surface 34 of disk 12. Reducing the size of this gap suitably improves coupling efficiency between diode bars 68 and disk 12, which is particularly important when diode bars 68 without microlenses are used. In an exemplary embodiment, the gap between diode bars 68 and disk 12 is on the order of about 1 mm or so, although other dimensions could be used in alternate embodiments.

FIG. 9 further shows several groups 67 of diode bars 68, with each group 67 arranged along one side of the polygonal perimeter edge 34 of disk 12, although diode bars 68 may be further grouped around disk 12 in any manner. The number of diodes in each group 67 may be selected such that the combined length "w" of the diode bars and the gaps therebetween is somewhat smaller than the lateral extend $D_L$ (FIG. 3) of gain medium 26 so that the slightly divergent beam 76 produced by each diode group 66 illuminates a substantial portion of gain medium 26. Space between diode bars 68 in each group 67 may be relatively small compared to the length of the diode bars, as appropriate. Again, the particular arrangement of diode bars 68 and groups 67 of diode bars 68 may be modified in many ways to arrive at any number of equivalent embodiments. In particular, the arrangement may be chosen in combination with the particular doping of gain medium 26 to produce a substantially uniform gain over a large portion of disk 12.

Figure 10:
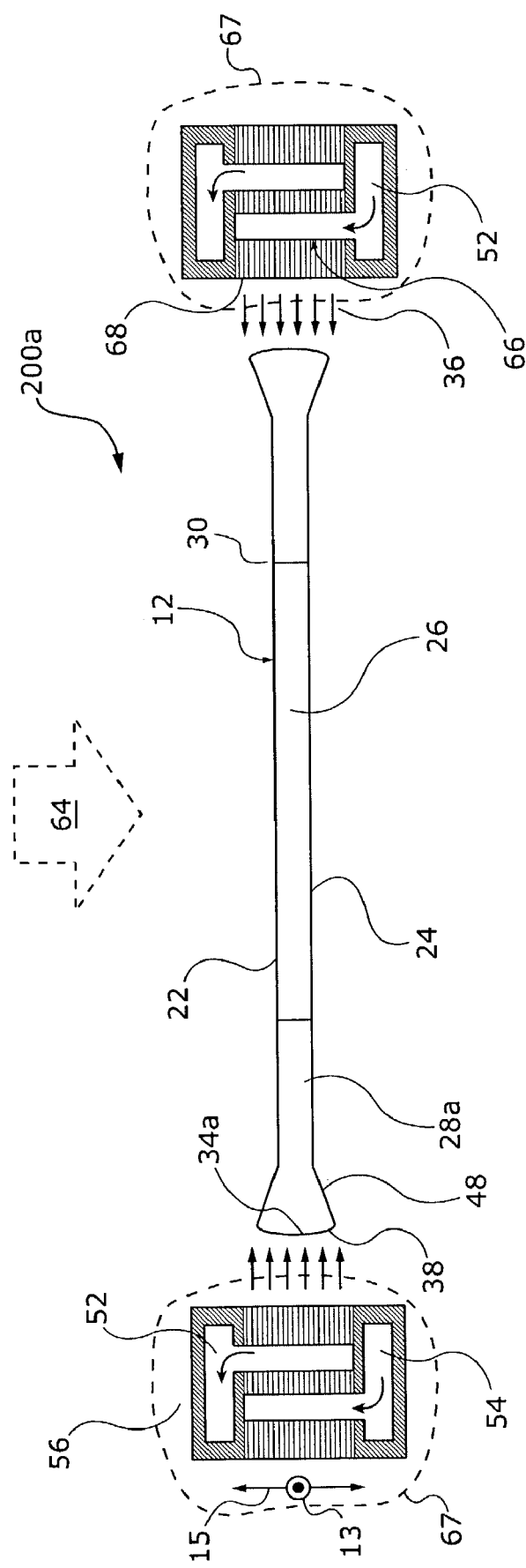
FIG. 10 is a cross-sectional view of an exemplary amplifier module with diode stack assemblies.

With reference now to FIG. 10, a further embodiment of a laser disk amplifier module 200a suitably includes any number of diode stack assemblies 67 providing pump radiation to a composite disk 12. Disk 12 is further shown with an optional tapered portion 48 and an optional curved surface 34a to improve coupling efficiency between diode bars 68 and disk 12, as described above. Each diode stack assembly 67 suitably includes any number of diode bars 68 formed into a stack 66. In various embodiments, each diode bar 68 is provided with a heat exchanger as described above. When multiple diode bars 68 are stacked, a chamber 52 for conducting coolant is appropriately formed. Accordingly, diode stack 66 may be provided with an inlet manifold 54 and an outlet manifold 56 to provide water or another coolant fluid to the various diode bars 68 in stack 66. Each stack 66 appropriately receives coolant 52 from input manifold 54 and discharges coolant into drain manifold 56. Each manifold 54 and 56 may also provide terminals for providing electric power for stack 66. Each diode stack 66 may be appropriately oriented such that the fast axes of the various diode bars 68 are orthogonal to the large surfaces of disk 12 for operation as described above in conjunction with FIG. 9.

Figure 11:
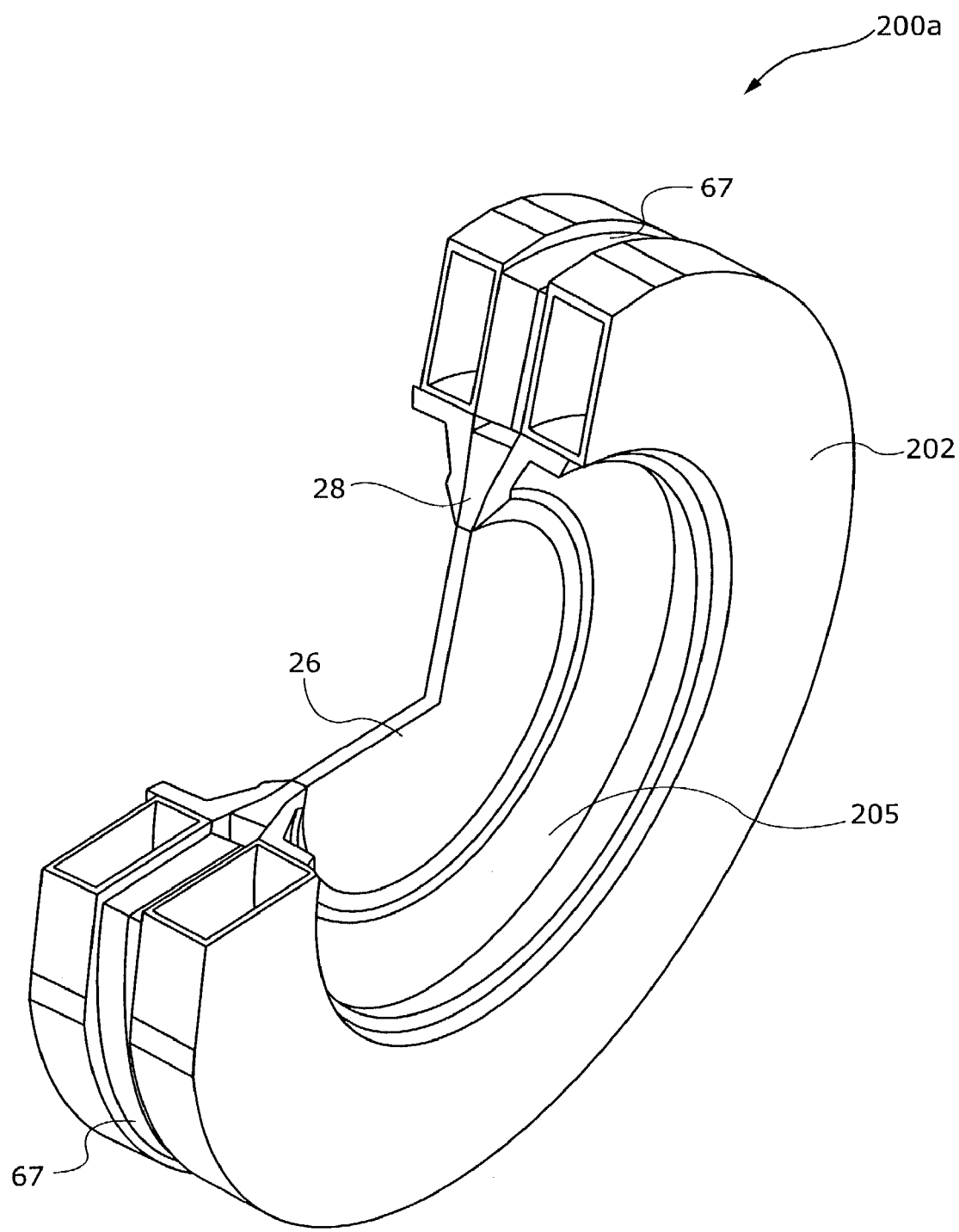
FIG. 11 is a perspective view of the exemplary amplifier module shown in FIG. 10.

FIG. 11 is an isometric view of an exemplary disk amplifier module 200a that includes a disk 12, several diode assemblies 67 and a collimator 205 contained between coolant manifolds 202a and 202b for use in a laser device. Any of the various laser amplifier modules 100/200 described herein may be used as a transmissive disk (FIG. 1(a)) or a reflective disk (FIG. 1(b)) for implementation in any type of laser device. In a transmissive device, surfaces 22 and 24 of disk 12 (see, e.g., FIGS. 3 and 10) are appropriately equipped with antireflective coatings to reduce reflective losses of the incident laser beam. Such coatings may not be necessary if the incident beam is polarized and the disk is place at or about the Brewster angle of incidence. Waste heat may be removed from a transmissive disk by flowing a suitable fluid (e.g. a gas) over both faces 22 and 24 of composite disk 12.

Figure 12:
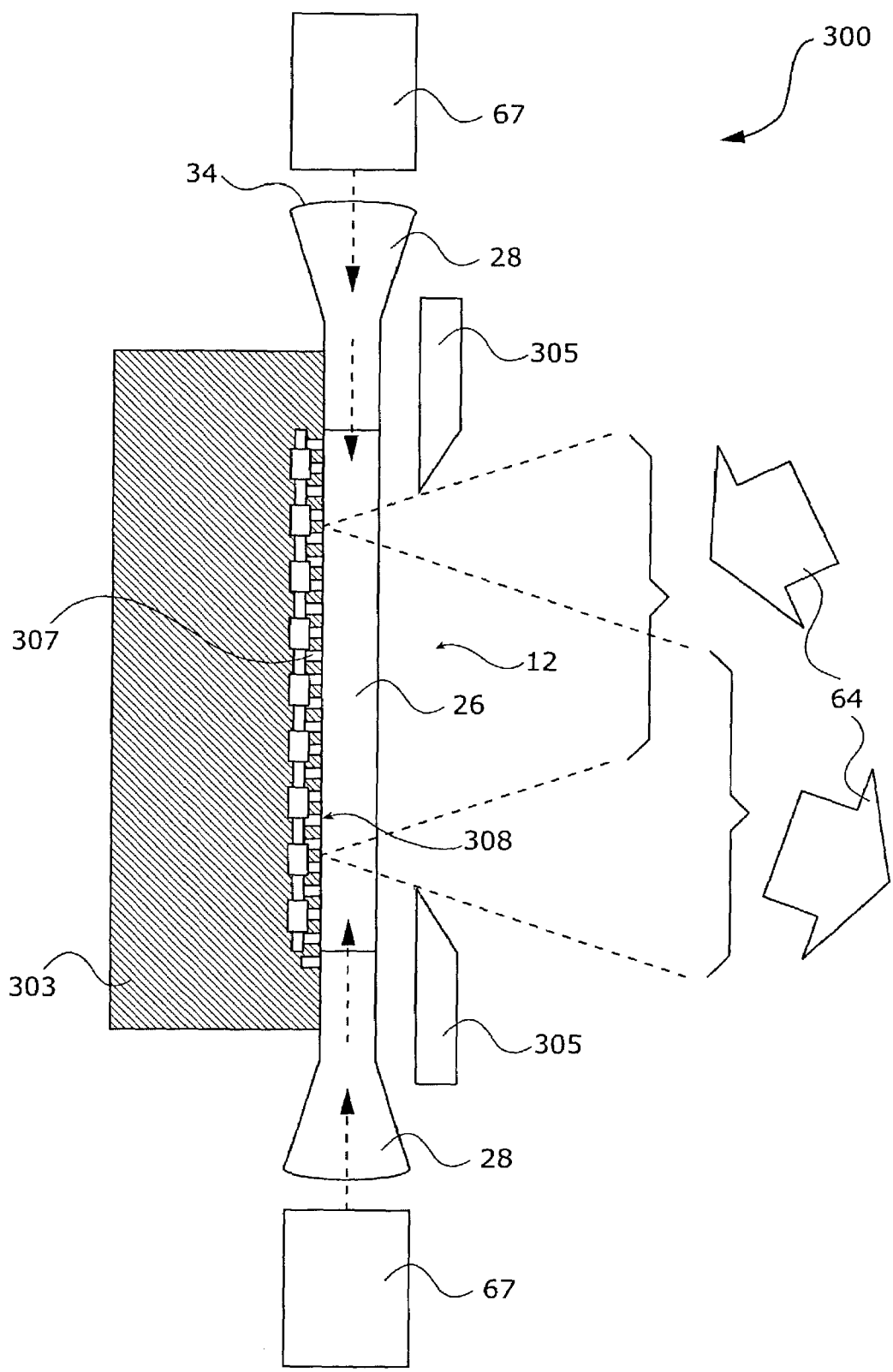
FIG. 12 is a cross-sectional view of an exemplary amplifier module mounted on a substrate.

Referring now to FIG. 12, an exemplary reflective disk assembly 300 suitably includes a composite disk 12 mounted on a substrate 303 and cooled by a heat exchanger 307. Disk 12 is appropriately provided with a high reflectivity coating 308 on the back surface. A collimator 305 may also be provided to further define the aperture of gain medium 26, as appropriate. In operation, laser beam 64 suitably impinges upon gain medium 26, which appropriately amplifies and reflects beam 64. Amplification takes place by providing pump radiation from diode assemblies 67 (which may include any number of diode bars 68 in any arrangement), as described above. An exemplary reflective disk is described in commonly assigned United States Patent Application Publication No. 2002/0097769.

Figure 13:
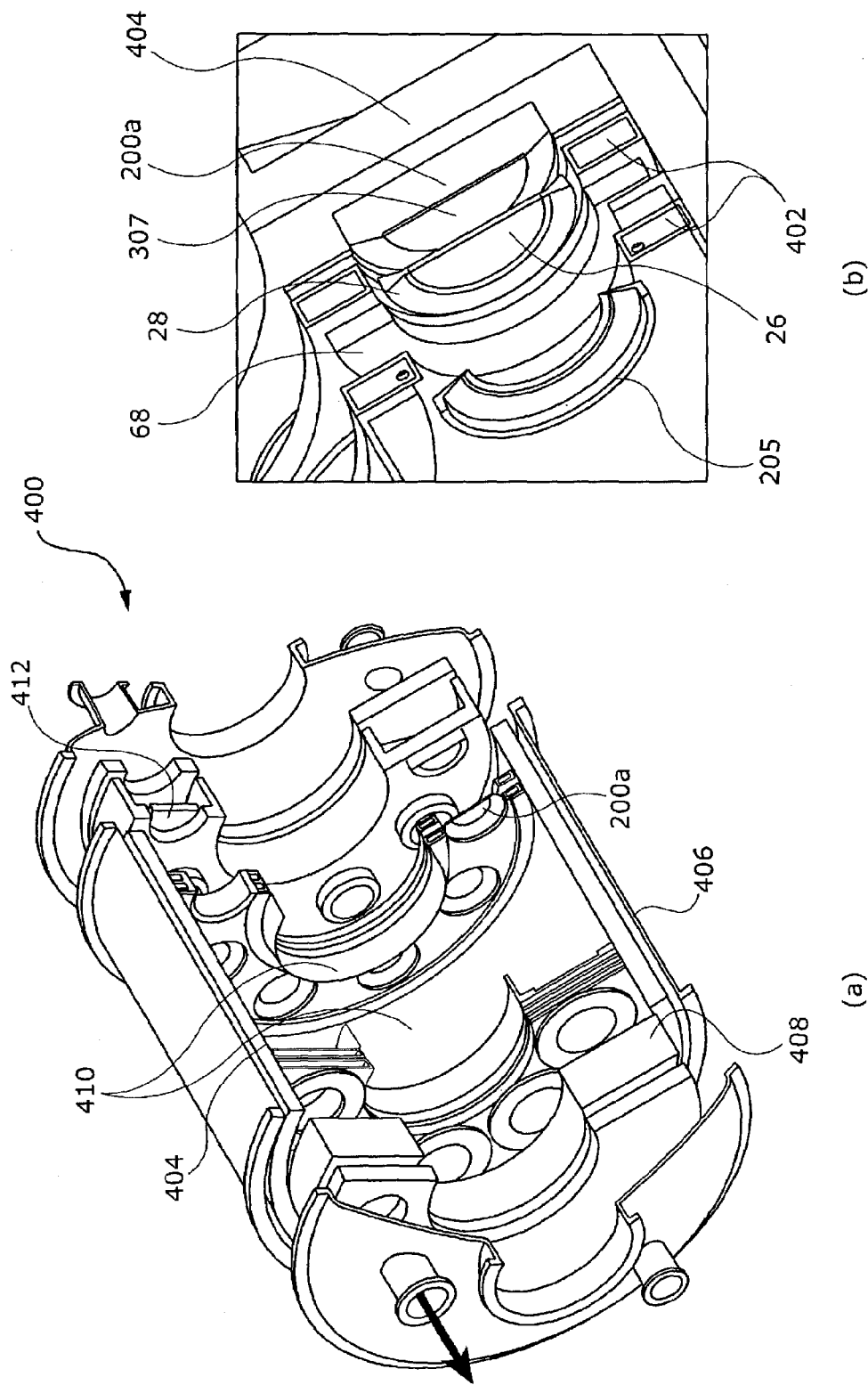
FIGS. 13(a) and (b) are cutaway perspective exploded views of an exemplary laser that is amplified with laser diodes.

With final reference now to FIGS. 13(a) and 13(b), an exemplary laser assembly 400 suitably includes one or more amplifier modules 200a supported by an optical bench 404 within a housing or other enclosure 406. As shown in FIG. 13(a), the various amplifier modules may be held in place by a shroud or other support 410 to allow laser light to pass through modules 200a as appropriate. A power converter 408 provides conditioned electrical power to the various components of laser 400, including diode arrays 68. As best seen in FIG. 13(b), each amplifier module 200a is appropriately mounted on a substrate 303 and heat exchanger 307, as described more fully above. Again, the various concepts and structures described herein may be adapted and incorporated into any type of solid state laser in a wide variety of equivalent embodiments.

While at least one exemplary embodiment has been presented in the foregoing detailed description, it should be appreciated that a vast number of equivalent variations exist. For example, the term "substantially" as used herein is intended to encompass certain deviations from the spatial descriptions set forth. Such deviations may be the result of manufacturing or design imperfections, for example, or the result of deviations (e.g. variation of 10% or more) from the terms used herein without deviation from the general concepts of the invention. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An amplifier module for a solid-state laser, the amplifier module comprising:
   a disk having two substantially parallel surfaces and a perimeter, the disk comprising a laser gain material;
   a plurality of diode bars arranged about the perimeter of the disk in a plurality of discontinuous diode bar groups and configured to provide optical pump radiation to the laser gain material, each diode bar group including at least two of the diode bars;
   wherein each of the plurality of diode bars is spatially aligned with the disk in such a manner as to produce substantially uniform gain across the laser gain material, the diode bar groups are separated by gaps void of diode bars, and spacing between adjacent diode bar groups exceeds spacing between adjacent diode bars within any diode bar group.

2. The amplifier module of claim 1 wherein each of the plurality of diode bars has a fast axis and a slow axis.

3. The amplifier module of claim 2 wherein each of the plurality of diode bars is positioned proximate to the perimeter of the disk with the fast axis of each diode bar substantially parallel to the two substantially parallel surfaces of the disk.

4. The amplifier module of claim 1 wherein the perimeter of the disk is substantially circular.

5. The amplifier module of claim 1 wherein each of the diode bars are oriented to direct the optical pump radiation toward a center point of the laser gain material.

6. The amplifier module of claim 2 wherein each of the plurality of diode bars is positioned proximate to the perimeter of the disk with the fast axis of each diode bar substantially orthogonal to the two substantially parallel surfaces of the disk.

7. The amplifier module of claim 1 wherein the diode bars within each diode bar group are located at substantially equal intervals from each other.

8. The amplifier module of claim 1 wherein the plurality of diode bar groups are located about the perimeter of the disk in substantially equal intervals from each other.

9. The amplifier module of claim 8 further comprising an amplified spontaneous emission (ASE) absorption material disposed about the perimeter of the disk between each of the plurality of diode bar groups.

10. The amplifier module of claim 9 wherein the absorption material is a coating.

11. The amplifier module of claim 9 wherein the absorption material is a cladding.

12. The amplifier module of claim 1 wherein the disk is a composite disk comprising an annular non-gain portion between the laser gain material and the perimeter.

13. The amplifier module of claim 12 wherein the non-gain portion comprises undoped optical material.

14. The amplifier module of claim 12 wherein the non-gain portion comprises a plurality of segmented sections.

15. The amplifier module at claim 12 wherein the non-gain portion comprises a tapered portion configured to receive the optical pump radiation from the plurality of diode bars.

16. The amplifier module of claim 1 wherein the disc comprises a curved edge along at least a portion of the perimeter.

17. The amplifier module of claim 1 further comprising at least one optical concentrator optically located between the plurality of diode bars and the disk, and configured to concentrate the optical pump radiation toward the disk.

18. The amplifier module of claim 1 further comprising at least one lens optically located between the plurality of diode bars and the disk, and configured to concentrate the optical pump radiation toward the disk.

19. A solid-state laser having an amplifier module configured to provide an optical gain for a source light, wherein the amplifier module comprises:
  a disk having two substantially parallel surfaces and a perimeter, the disk comprising a laser gain material; and
  a plurality of diode bars, each diode bar having a fast axis, arranged about the perimeter of the disk in a plurality of discontinuous diode bar groups and configured to provide optical pump radiation to the laser gain material, each diode bar group including at least two of the diode bars;
  wherein each of the plurality of diode bars is spatially aligned with the disk in such a manner as to produce substantially uniform gain across the laser gain material, the diode bar groups are separated by gaps void of diode bars, and spacing between adjacent diode bar groups exceeds spacing between adjacent diode bars within any diode bar group.

20. The solid-state laser of claim 19 wherein each of the plurality of diode bars is positioned proximate to the perimeter of the disk with the fast axis of each diode bar substantially parallel to the two substantially parallel surfaces of the disk.

21. The solid-state laser of claim 19 wherein each of the plurality of diode bars is positioned proximate to the perimeter of the disk with the fast axis of each diode bar substantially orthogonal to the two substantially parallel surfaces of the disk.

22. A solid-state laser having an amplifier module, wherein the amplifier module comprises:
  a disk having two substantially parallel surfaces and a perimeter, the disk comprising a laser gain material;
  a plurality of diode bars arranged about the perimeter of the disk in a plurality of discontinuous diode bar groups and configured to provide optical pump radiation to the laser gain material; and
  an amplified spontaneous emission (ASE) absorption material disposed about the perimeter of the disk between the plurality of discontinuous diode bar groups.

23. A solid-state laser configured to produce a laser beam, the amplifier module comprising:
  means for amplifying the laser beam, the amplifying means having two substantially parallel surfaces and a perimeter;
  a plurality of discontinuous groups of optical pump radiation source elements disposed about the perimeter of the amplifying means in such a manner as to provide optical pump radiation to produce substantially uniform gain across the amplifying means; and
  means for absorbing amplified spontaneous emissions (ASE) from the amplifying means, the means for absorbing ASE being located around the perimeter of the amplifying means and between the groups of optical pump radiation source elements.

24. The solid-state laser of claim 23 wherein each of the optical pump radiation source elements comprises a diode bar.

25. A method of producing substantially uniform gain in a solid-state laser, the method comprising the steps of:
  producing a laser beam;
  providing pump radiation from a plurality of diode bars to a disk amplifier having a laser gain material and a perimeter, wherein the diode bars are disposed along the perimeter of the disk amplifier in a plurality of discontinuous diode bar groups, each diode bar group includes at least two of the diode bars, each of the plurality of diode bars is spatially aligned with the disk amplifier in such a manner as to produce substantially uniform gain across the laser gain material, the diode bar groups are separated by gaps void of diode bars, and spacing between adjacent diode bar groups exceeds spacing between adjacent diode bars within any diode bar group; and
  amplifying the laser beam with the disk amplifier.

26. The method of claim 25 wherein each of the plurality of diode bars comprises a fast axis, and wherein the amplifier disk comprises two substantially parallel surfaces.

27. The method of claim 26 wherein each of the plurality of diode bars is positioned proximate to the perimeter of the disk with the fast axis of each diode bar substantially parallel to the two substantially parallel surfaces of the amplifier disk.

28. The method of claim 26 wherein each of the plurality of diode bars is positioned proximate to the perimeter of the disk with the fast axis of each diode bar substantially orthogonal to the two substantially parallel surfaces of the amplifier disk.

29. An amplifier module for a solid-state laser, the amplifier module comprising:
  a disk having two substantially parallel surfaces and a perimeter, the disk comprising a laser gain material;
  a plurality of diode bars arranged about the perimeter of the disk in a plurality of discontinuous diode bar groups and configured to provide optical pump radiation to the laser gain material, the plurality of diode bar groups being located about the perimeter of the disk in substantially equal intervals from each other; and
  an amplified spontaneous emission (ASE) absorption material disposed about the perimeter of the disk between each of the plurality of diode bar groups;
  wherein each of the plurality of diode bars is spatially aligned with the disk in such a manner as to produce substantially uniform gain across the laser gain material.

* * * * *